US009182287B2

(12) United States Patent
Yonemura et al.

(10) Patent No.: US 9,182,287 B2
(45) Date of Patent: Nov. 10, 2015

(54) INFRARED SENSOR, HEAT SENSING ELEMENT, AND HEAT SENSING METHOD USING THE SAME

(71) Applicant: SEIKO EPSON CORPORATION, Tokyo (JP)

(72) Inventors: Takayuki Yonemura, Suwa (JP); Takafumi Noda, Matsumoto (JP); Yasushi Tsuchiya, Sr., Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/221,951

(22) Filed: Mar. 21, 2014

(65) Prior Publication Data

US 2015/0129765 A1   May 14, 2015

(30) Foreign Application Priority Data

Mar. 25, 2013  (JP) .................................. 2013-062664

(51) Int. Cl.
| | | |
|---|---|---|
| *G01J 5/02* | (2006.01) | |
| *G01J 5/10* | (2006.01) | |
| *G01J 5/22* | (2006.01) | |
| *G01J 5/34* | (2006.01) | |
| *G01K 7/00* | (2006.01) | |

(52) U.S. Cl.
CPC .... *G01J 5/10* (2013.01); *G01J 5/22* (2013.01); *G01J 5/34* (2013.01); *G01K 7/00* (2013.01)

(58) Field of Classification Search
CPC ......... G01J 1/44; G01J 5/0025; G01J 5/0806; G01J 5/22; G01J 5/34
See application file for complete search history.

(56) References Cited

U.S. PATENT DOCUMENTS

| | | | | |
|---|---|---|---|---|
| 5,141,903 | A * | 8/1992 | Kawabata et al. | 501/134 |
| 5,293,261 | A * | 3/1994 | Shashidhar et al. | 349/183 |
| 5,949,071 | A | 9/1999 | Ruffner et al. | |
| 6,093,338 | A | 7/2000 | Tani et al. | |
| 2005/0161604 | A1* | 7/2005 | Baniecki et al. | 250/339.06 |
| 2009/0200471 | A1 | 8/2009 | Kawakubo et al. | |
| 2011/0102514 | A1 | 5/2011 | Yonemura | |
| 2011/0102517 | A1 | 5/2011 | Yonemura et al. | |

(Continued)

FOREIGN PATENT DOCUMENTS

| | | |
|---|---|---|
| EP | 0338639 | 10/1989 |
| FR | 2223868 | 10/1974 |

(Continued)

OTHER PUBLICATIONS

Huang et al., "Optical and electrical properties of multiferroic bismuth ferrite thin films fabricated by sol-gel techniques," 2010, Materials Letters, vol. 64, pp. 2233-2235.*

(Continued)

*Primary Examiner* — Kiho Kim
(74) *Attorney, Agent, or Firm* — Workman Nydegger (57) ABSTRACT

An infrared sensor includes a heat sensing element in which a first electrode, a dielectric film, and a second electrode are sequentially laminated; and an electric charge detection device. The dielectric film represents antiferroelectricity and has a spontaneous polarization in a predetermined measurement environment. The electric charge detection device calculates an amount of relaxation current flowing by a change of the spontaneous polarization, and senses heat of the heat sensing element based on temperature dependence of the amount of relaxation current.

7 Claims, 7 Drawing Sheets

(56) References Cited

U.S. PATENT DOCUMENTS

2011/0102518 A1 5/2011 Yonemura et al.
2012/0132808 A1 5/2012 Yamamura

FOREIGN PATENT DOCUMENTS

| JP | 09-126895 | 5/1997 |
| JP | 2003-530538 | 2/1999 |
| JP | 2009-068863 | 4/2009 |
| JP | 2011-093295 | 5/2011 |
| JP | 2011-097002 | 5/2011 |
| JP | 2011-116111 | 6/2011 |
| JP | 2012-117847 | 6/2012 |

OTHER PUBLICATIONS

Miyasato et al., "Direct method with triangular waves for measuring spontaneous polarization in ferroelectric liquid crystals," 1983, vol. 22, No. 10, pp. L661-L663.*

European Search Report for Application No. 14161094.9 dated Jul. 4, 2014.

* cited by examiner

FIG. 5A EXAMPLE 1

FIG. 5C EXAMPLE 3

FIG. 5B EXAMPLE 2

FIG. 5E EXAMPLE 5

FIG. 5D EXAMPLE 4

FIG. 5F EXAMPLE 6

INFRARED SENSOR, HEAT SENSING ELEMENT, AND HEAT SENSING METHOD USING THE SAME

BACKGROUND

1. Technical Field

The present invention relates to an infrared sensor, a heat sensing element, and a heat sensing method using the same.

2. Related Art

An infrared sensor is divided into a quantum type and a heat type by a detection principle. The heat type of the two types attracts attention from the viewpoint of exclusion of cooling for noise measures, and is widely distributed in a motion sensor or the like. Such a heat type of infrared sensor includes a heat sensing element which absorbs heat energy of infrared light, causes temperature change and then changes electrical properties.

Recently, from the viewpoint of high sensitivity, a high responsibility, or the like, the size of one pixel in the infrared sensor has been considerably small, and a dielectric material is desired to form a thin film. Therefore, a pyroelectric sensor which uses PZT produced using a spin coat method as the dielectric material has been proposed (refer to JP-T-2003-530538).

However, an infrared sensor described in JP-T-2003-530583 is said not to have sufficient sensitivity yet, and an infrared sensor with better sensitivity is required.

SUMMARY

An advantage of some aspects of the invention is that an infrared sensor and a heat sensing element and a heat sensing method using the same which can improve sensitivity of the infrared sensor are provided.

According to an aspect of the invention, there is provided an infrared sensor including: a heat sensing element in which a first electrode, a dielectric film, and a second electrode are sequentially laminated; and an electric charge detection device, in which the dielectric film represents antiferroelectricity and has a spontaneous polarization in a predetermined measurement environment, and in which the electric charge detection device calculates an amount of current flowing by a change of the spontaneous polarization, and senses heat of the heat sensing element based on temperature dependence of the amount of current.

In the infrared sensor, sensitivity of the infrared sensor which represents antiferroelectricity and uses the dielectric film having the spontaneous polarization in the predetermined measurement environment, can be improved.

In addition, it is preferable that the dielectric film be configured in such a manner that the spontaneous polarization is gradually changed in the predetermined measurement environment.

According to this, a speed of a current flowing by the spontaneous polarization can be decreased, and an amount of current can be accurately calculated.

In addition, it is preferable that the dielectric film be preferentially oriented in a (111) plane. According to this, it is possible to reduce an amount of consumption of the voltage required for triggering a phase transition.

In addition, it is preferable that one of the first electrode and the second electrode be connected to a power supply, and the other of the first electrode and the second electrode be connected to the electric charge detection device.

According to this, heat sensing based on the temperature dependence of the amount of current can be realized using a simple configuration.

In addition, according to another aspect of the invention, there is provided a heat sensing element including: a first electrode; a dielectric film; and a second electrode, in which the first electrode, the dielectric film, and the second electrode are sequentially laminated, and in which the dielectric film represents antiferroelectricity, and has a spontaneous polarization in a predetermined measurement.

In the heat sensing element, the sensitivity of the infrared sensor which uses the dielectric film representing the antiferroelectricity and having the spontaneous polarization in the predetermined measurement environment, can be improved.

In addition, according to still another aspect of the invention there is provided a heat sensing method that uses the heat sensing element including the dielectric film which is formed between the first electrode and the second electrode, represents the antiferroelectricity, and has the spontaneous polarization in the predetermined measurement environment, the method including applying a voltage that generates the spontaneous polarization in the dielectric film; and calculating the amount of current flowing by the spontaneous polarization, and sensing heat of the heat sensing element based on the temperature dependence of the amount of current.

In the heat sensing element, the sensitivity of the infrared sensor which uses the dielectric film representing the antiferroelectricity and having the spontaneous polarization in the predetermined measurement environment, can be improved.

In addition, it is preferable that the heat of the heat sensing element be sensed by using a difference obtained by comparing the calculated amount of current with a reference value. According to this, based on the temperature dependence of the obtained difference, the heat sensing of the heat sensing element can be performed.

In addition, it is preferable that the reference value be an amount of current generated by the heat sensing element in a state where infrared light is shielded, or an amount of current generated by the heat sensing element for reference which does not cause a resistance change based on the infrared light. According to this, a difference between the amounts of currents can be determined, and influence due to errors caused when measuring can be decreased, and thus the sensitivity of the infrared sensor can be improved. In addition, as a method of obtaining the difference, a method of performing cancellation using a circuit configuration, a method of subtracting obtained data using calculation processing, or the like is used.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, based on FIGS. 1A to 8, embodiments according to the invention will be described in detail. Such embodiments represent aspects of the invention, but does not limit the invention, and can be arbitrarily modified within a scope of the invention. In the configuration members of FIGS. 1A to 8, the same symbols reference the same members, and description thereof will be appropriately omitted.

1. Infrared Sensor (1) Schematic Configuration

Figure 1A:
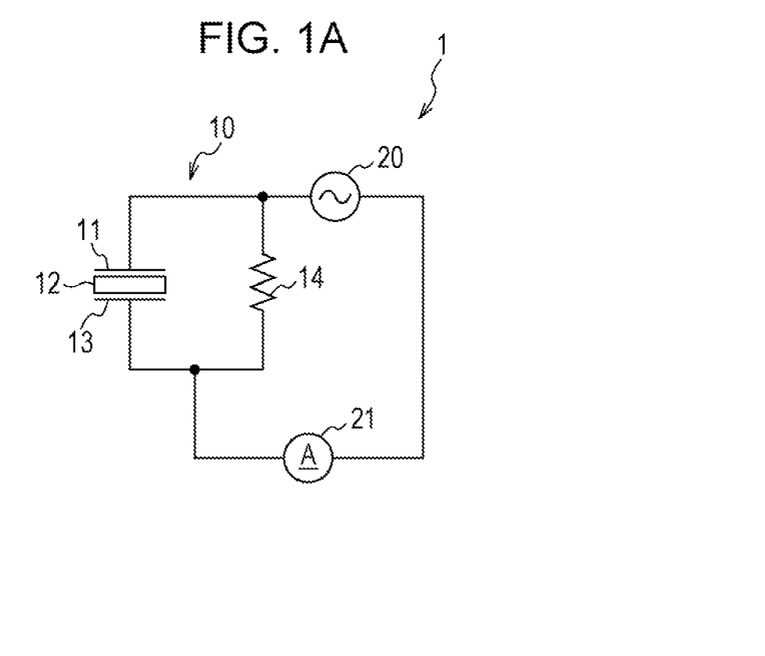
FIGS. 1A and 1B are diagrams illustrating schematic configurations of infrared sensors according to embodiments of the invention.
Figure 1B:
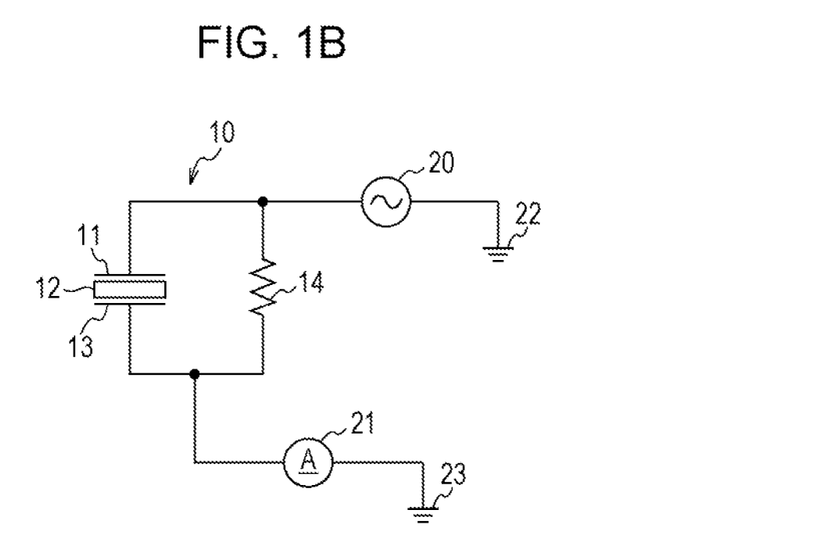

FIGS. 1A and 1B are diagrams illustrating schematic configurations of infrared sensors according to embodiments of the invention.

The infrared sensor 1 illustrated in FIG. 1A, includes a heat sensing element 10, a power supply 20, and an electric charge detection device 21. Although omitted in FIGS. 1A and 1B, it does not matter that a configuration of window material, a cap or the like which packages such members, uses a well-known art.

The heat sensing element 10 sequentially includes a first electrode 11, a dielectric film 12 which represents antiferroelectricity, and a second electrode 13. Among these, the first electrode 11 is connected to the power supply 20, and the second electrode 13 is connected to the electric charge detection device 21.

The heat sensing element 10 causes a temperature change according to heat energy of infrared light or a voltage signal, and an electrical property thereof is changed to have a property which outputs a current signal. Thus, in the infrared sensor 1, the heat energy or the like of the infrared light is detected as the current signal, and based on this, the received infrared light is detected.

If a predetermined voltage is applied, the dielectric film 12 has a property in which phase transition (AF→F) from an antiferroelectric phase AF to a ferroelectric phase F occurs. For example, the predetermined voltage is a rectangular pulse having a voltage equal to or greater than a phase transition voltage $V_F$ which is the minimum required for the phase transition (AF→F). According to this, the applied voltage exceeds the phase transition voltage $V_F$, and the phase transition (AF→F) is reliably triggered. But, the above-described predetermined voltage is not limited to such a rectangular pulse.

On the other hand, in the dielectric film 12, the phase transition is reversely triggered, in response to the rectangular pulse. That is, the dielectric film 12 performs phase-transition (F→AF) from the ferroelectric phase F to the antiferroelectric phase AF, according to an application end of the rectangular pulse.

In conjunction with the phase transition (F→AF), a current (hereinafter, referred to as relaxation current) is generated from the heat sensing element 10. A total amount of the relaxation current depends on an amount of electric charges which are induced by the phase transition (AF→F), and the time when the relaxation current flows depends on the temperature. For this reason, an amount of relaxation current flowing for a certain time has temperature dependence, and is calculated by the electric charge detection device 21. That is, the infrared sensor 1 according to the embodiment of the invention has a function of detecting heat of the heat sensing element 10, based on the temperature dependence of the relaxation current.

The infrared sensor having such a function is not limited to the configuration of FIG. 1A, but may be a configuration of an infrared sensor 2 illustrated in FIG. 1B in which the power supply 20 and the electric charge detection device 21 are connected to a ground 22 or 23, respectively. In addition, the heat sensing element may also be configured by installing a resistor 14 which divides a voltage, with the dielectric film 12 in parallel, and the power supply, and the heat sensing element and the electric charge detection device may be connected in parallel with one another, as long as the gist of the invention is not modified.

Figure 2A:
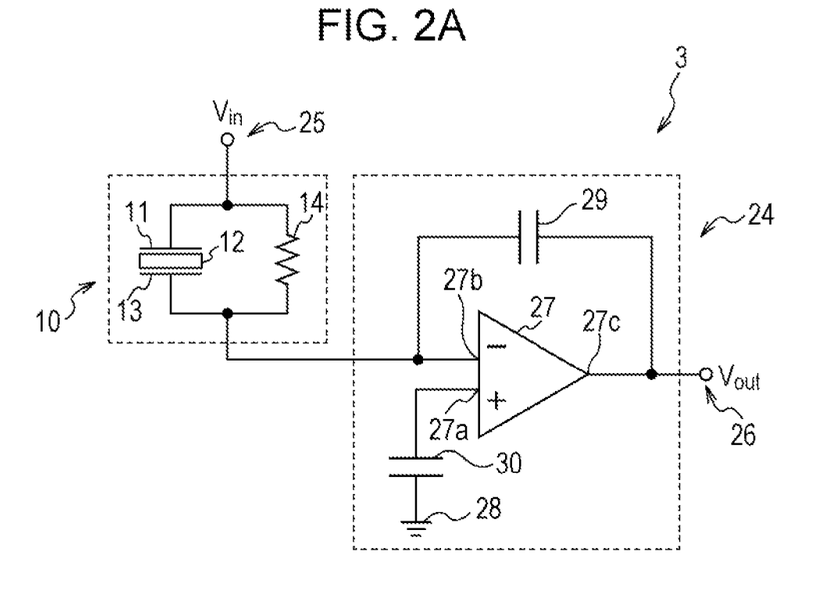
FIGS. 2A and 2B are diagrams illustrating schematic configurations of infrared sensors according to embodiments of the invention.
Figure 2B:
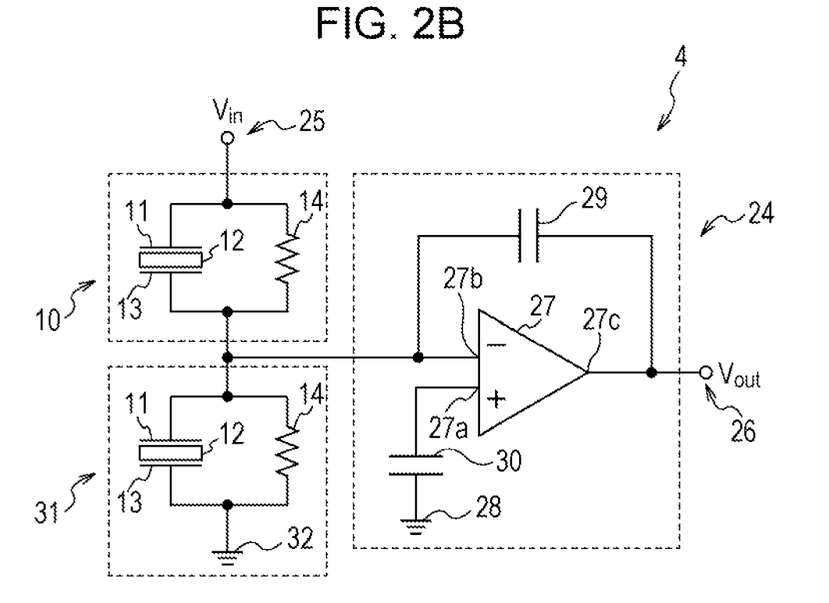

Furthermore, the infrared sensor according to the embodiments of the invention may be configured to have an integration circuit 24 as the electric charge detection device, as illustrated in FIGS. 2A and 2B.

For example, the infrared sensor 3 illustrated in FIG. 2A is configured to include an input power supply 25 which applies a voltage, the heat sensing element 10, the integration circuit 24 as the electric charge detection device, and a detection device 26 which detects a signal of the integration circuit 24.

The integration circuit 24 includes an operational amplifier 27. The operational amplifier 27 has a positive input terminal 27a, a negative input terminal 27b and an output terminal 27c. The positive input terminal 27a is connected to a ground 28, the negative input terminal 27b is connected to the second electrode 13, and the output terminal 27c is connected to the detection device 26. Between the negative input terminal 27b and the output terminal 27c, a capacitor 29 is formed in parallel with the operational amplifier 27, and electric charges output from the operational amplifier 27 are stored in the capacitor 29. Meanwhile, as illustrated in FIG. 2A, the positive input terminal may be grounded through a capacitor 30.

According to the infrared sensor 3 including such an integration circuit 24, the current flowing from the heat sensing element 10 is converted into a voltage signal and amplified by the capacitor 29 and the operational amplifier 27, and the amplified voltage can be detected by the detection device 26.

A configuration of the infrared sensor 4 illustrated in FIG. 2B includes a heat sensing element for reference, that is, a reference element 31, in addition to the configuration of FIG. 2A. For example, the reference element 31 uses the same heat sensing element as the heat sensing element 10, and is configured to have a shield plate formed on an incident surface of the infrared light. The reference element 31 which has the first electrode 11, a dielectric film 12 and the second electrode 13 is connected in parallel with the resistor 14, one side of each thereof is connected to a ground 32, and each of the other side of each thereof is connected to the heat sensing element 10. That is, in FIG. 2B, the reference element 31 and the heat sensing element 10 are connected in series with each other, and connected to the negative input terminal 27b of the operational amplifier 27 through a common connection line between them.

A function of an infrared sensor 4 having the reference element 31 is as follows. That is, even when an error occurs in the current from the heat sensing element 10, by an installation environment or time degradation of the infrared sensor, such an error can occur even in the same manner as in the current from the reference element 31 which is configured using the same element as for the heat sensing element 10, for example. Thus, the error of the current caused in the same manner as in both elements can be offset during integration, and thereby it is possible to prevent the error from occurring in an output voltage. As a result, a change of a resistance value can be accurately detected, and a sensitivity of the infrared sensor can be improved.

Meanwhile, in the embodiment of the invention, a portion that calculates an amount of relaxation current and a portion that performs a heat detection using the amount of relaxation current depend on the electric charge detection device, but these two portions may be separately configured.

(2) Heat Sensing Element

As described above, the heat sensing element 10 sequentially includes the first electrode 11, the dielectric film 12 and the second electrode 13.

Figure 3:
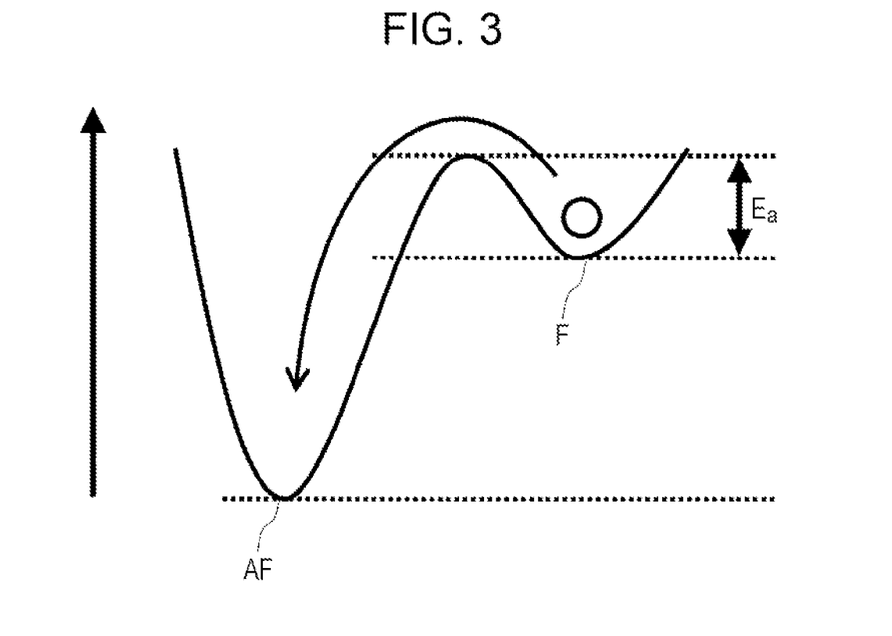
FIG. 3 is a schematic diagram for explaining an energy state diagram of a dielectric film in a predetermined measurement environment.

Among these, the dielectric film 12 represents the antiferroelectricity, and has a spontaneous polarization in a predetermined measurement environment. FIG. 3 illustrates a schematic diagram of an energy state diagram of the dielectric film 12 in the predetermined measurement environment. As illustrated in FIG. 3, the dielectric film 12 has the ferroelectric phase F which is in a metastable state, and the antiferroelectric phase AF which is in a stable state, in the predetermined measurement environment.

By an application of the rectangular pulse, the phase transition (AF→F) is generated from the stable state to the metastable state, and by the application end of the rectangular pulse, the phase transition (F→AF) is generated from the metastable state to the stable state. At this time, a speed of the phase transition (F→AF) is regulated by activation energy $E_a$, the phase transition (F→AF) is continued after the application end of the rectangular pulse, the ferroelectric phase F exists as the metastable state, and the dielectric film 12 has the spontaneous polarization.

The embodiment of the invention attracts attention in that there is temperature dependence in the speed of the phase transition (F→AF), the relaxation current is found as a value correlating to the speed of this phase transition (F→AF), and heat of the heat sensing element 10 is sensed based on the amount of the relaxation current.

A size of the activation energy $E_a$ can be adjusted by the configuration of the dielectric film. Thus, it is preferable that the dielectric film 12 be configured so as to be the activation energy $E_a$ in which the spontaneous polarization is gradually changed in the predetermined measurement environment. According to this, after the application end of the rectangular pulse, the time when the ferroelectric phase F exists as the metastable state becomes long, the speed of the relaxation current decreases, and the amount of relaxation current can be accurately calculated.

Particularly, it is preferable that the dielectric film 12 be configured so as to be the activation energy $E_a$ in which the spontaneous polarization is gradually changed at 0 V and near room temperature. According to this, in a main installation temperature environment of the infrared sensor, heat sensing can be performed based on the amount of relaxation current, and availability can be improved. Meanwhile, temperature near room temperature is 260 k to 320 k.

As described above, in the embodiment of the invention, the configuration of the dielectric film can be adjusted, and an infrared sensor with great sensitivity corresponding to a relatively wide temperature environment can be realized.

In addition, it is preferable that the dielectric film 12 be preferentially oriented in a (111) plane. According to this, a ratio of an execution voltage valid for a change of a polarization can be increased, and consumption of a voltage required to trigger the phase transition can be reduced. The antiferroelectricity of BLFM or the like results from a superlattice structure of four times a period with respect to a unit lattice of ABO$_3$ structure, and deviation of a center of the electric charges of the unit lattice is present in the direction twisted from an a-axis and a b-axis. For this reason, in a case where an angle of the center of the electric charges between an electric field generated by the applied voltage and the unit lattice is large, for example a (100) plane, the execution voltage valid for the change of the polarization direction becomes small, and a voltage required for the phase transition becomes large. Accordingly, this case is not preferable.

In addition, it is preferable that a thickness of the dielectric film 12 be 50 nm to 600 nm, and it is more preferable that the thickness of the dielectric film 12 be 150 nm to 400 nm. The reason is that if the thickness of the dielectric film is smaller than the above-described range, it can be difficult to absorb the infrared light, and if the thickness of the dielectric film is greater than the above-described range, a heat capacity becomes large, and as a result this influences the sensitivity and a response speed of the infrared sensor, and accordingly, it is not preferable.

Meanwhile, the first electrode 11 and the second electrode 13 of the heat sensing element 10 can use a conductive material, and specifically can use Pt, Ti, Cr, Al, Au, Cu or the like. Such a first electrode 11 and a second electrode 13 are layer shapes or thin film shapes. Such shapes, materials, thicknesses and the like can be modified, as long as the gist of the invention is not modified.

As the dielectric film 12 described above, for example, configurations represented in the following composite formulas (1) to (2) can be used.

$$(Bi_{1-x}La_x)(Fe_{1-y}Mn_y)O_3 \tag{1}$$

$$(Bi_{1-x}L_x)(Fe_{1-y-z}Mn_yTi_z)O_3 \tag{2}$$

The dielectric film represented in the above-described formulas (1) to (2) is configured as a composite oxide of an ABO$_3$ type structure having a perovskite structure. An A-site has oxygen of 12-coordination, and in addition, a B-site has oxygen of 6-coordination in the form of an octahedron.

For example, the dielectric film represented in the above-described formula (1) includes Bi, La, Fe and Mn, and is denoted as a composite oxide which includes bismuth ferrite (BiFeO$_3$), lanthanum ferrite (LaFeO$_3$), and manganese bismuth (BiMnO$_3$).

In addition, the dielectric film represented in the above-described formula (2) includes Bi, La, Fe, Mn and Ti, and is formed of a composite oxide in which a portion of Fe in the above-described formula (2) is substituted with Ti.

Any one of x, y and z in the formulas (1) and (2) can take a value equal to or greater than "0" and equal to or less than "1". As such values, charge-in quantity of raw materials used when forming the dielectric film may be represented, and after the dielectric film is formed, a composition of the dielectric film may be represented. In addition, the dielectric film is not limited to the above-described configuration, but may include a different compound or metal, as long as the gist of the invention is not modified. In addition, in various analyses, each composite oxides includes a case where elements other than Bi, La, Fe, Mn, Ti and O$_2$ cannot be detected, a case where a trace amount is recognized, and a case where there is a deviation from a composition of a stoichiometry due to loss and surplus.

2. Heat Sensing Method

Next, a heat sensing method using the heat sensing element 10 described above will be described.

Figure 4:
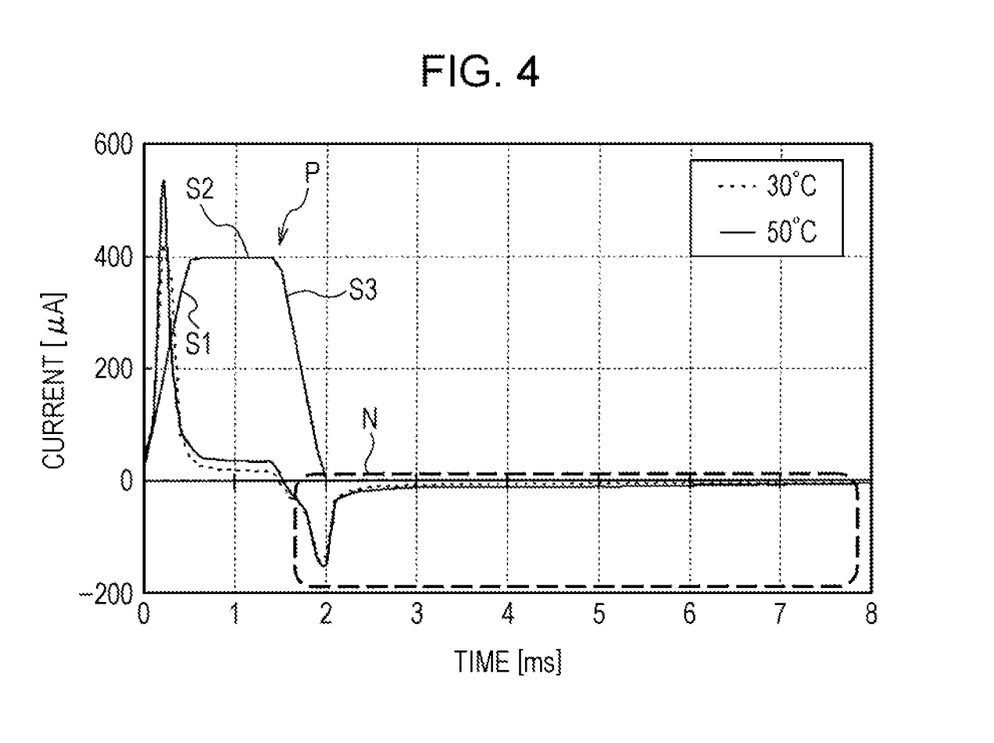
FIG. 4 is a timing chart diagram illustrating a measurement result of an example 1.
Figure 5A:
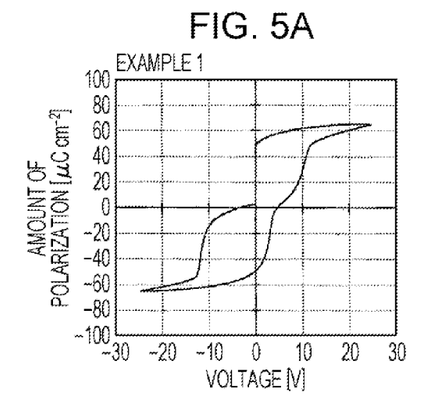
FIGS. 5A to 5F are diagrams illustrating P-E curves of examples 1 to 6.
Figure 5B:
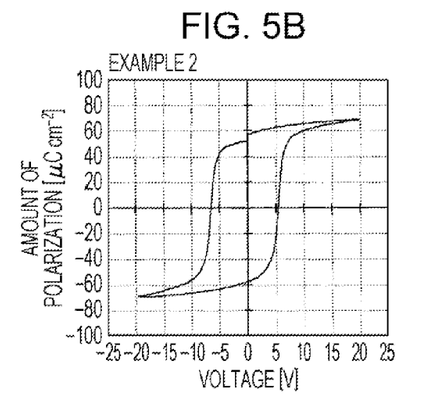
Figure 5C:
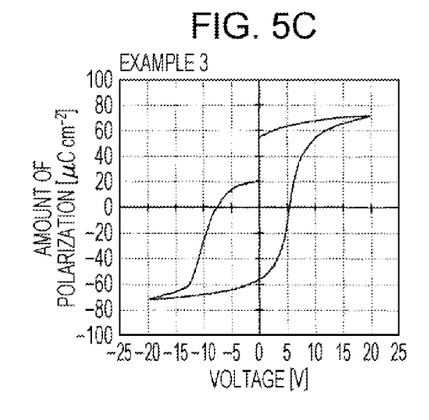
Figure 5D:
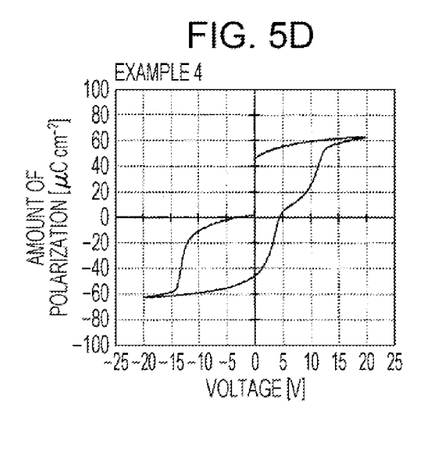
Figure 5E:
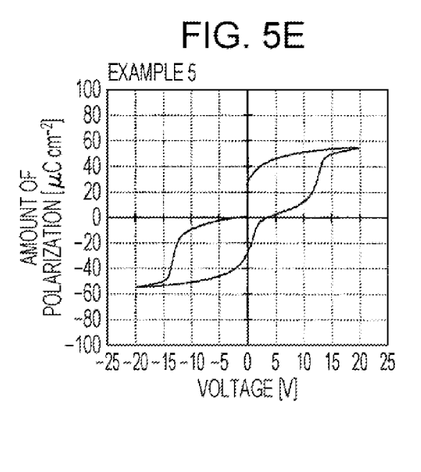
Figure 5F:
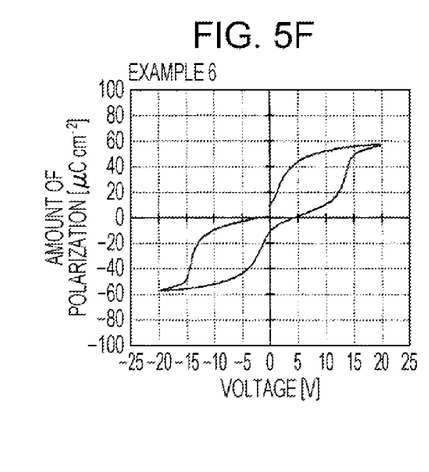

FIG. 4 is a timing chart illustrating the heat sensing method according to the embodiment of the invention, and is a measured result of the example 1 described later. A vertical axis denotes a size of a current and a horizontal axis denotes time.

First, the rectangular pulse P begins to be applied from time 0 ms. Then, a voltage value rises from 0 V to 20 V during a period of time 0 ms to 0.5 ms (S1). During this time, the phase transition (AF→F) is triggered from the antiferroelectric phase AF to the ferroelectric phase F, and based on this, a current flows.

Next, during the period of time 0.5 ms to 1.5 ms, the voltage is constantly retained (S2).

Then, at the time of 1.5 ms, the application of the rectangular pulse P ends. Even after the time of 1.5 ms, the ferroelectric phase F exists as the metastable state, whereby the dielectric film has the spontaneous polarization, and the relaxation current denoted by a broken line area N flows. During the period of time 1.5 ms to 2.0 ms, the voltage falls from 20 V to 0 V (S3), and after the voltage becomes 0 V, the relaxation current continues to flow.

The embodiment of the invention calculates the amount of relaxation current by integrating the relaxation current, and compares the calculated amount of relaxation current with a predetermined reference value as the measured value for the heat sensing.

It is preferable that the reference value be an amount of current generated by the heat sensing element in a state where the infrared light is shielded, or an amount of current generated by the heat sensing element which is used for reference and does not cause a resistance change according to the infrared light. According to this, it is possible to perform the heat sensing using a difference obtained by comparing the amounts of currents to each other, whereby even when a unique offset error, a stepwise error or the like occurs for each measurement, influence of the error can be reduced. But, a predetermined fixed value as the reference value can also be used, and in this case, a control load can be decreased.

Meanwhile, transmission and cutoff of the infrared light can be performed using a liquid crystal panel which switches transmission and non-transmission of light by controlling a liquid crystal orientation, or using a device such as a shutter that opens and closes a window portion which is a path of the infrared light, and that is driven by a motor.

In addition, in order to obtain the measured value for the heat sensing, integral conditions of the relaxation current will be described.

It is preferable that an integration time point of the relaxation current be a time point (time point of 2 ms illustrated in FIG. 4) at which a voltage in the heat sensing element 10 becomes 0 V. According to this, a ratio of the relaxation current included in the measured value for the heat sensing can be increased, the temperature dependence can be increased, and the sensitivity of the infrared sensor can be improved.

Meanwhile, the integration time point of the relaxation current may be a time point (for example, time point of 2.1 ms) later than the time point (time point of 2 ms illustrated in FIG. 4) when the voltage in the heat sensing element 10 becomes 0 V. According to this, when there is an error caused by a signal delay of a power supply circuit, the error can be avoided.

Meanwhile, the relaxation current may be included in the measured value for the heat sensing, and accordingly, a time point before the voltage in the heat sensing element becomes 0 V, for example, a time point (time point of 1.5 ms illustrated in FIG. 4) when the application of the rectangular pulse ends, can also be set as a starting point.

In addition, it is preferable that an integration time of the relaxation current be time equal to or longer than 0 ms and equal to or shorter than 30 ms. According to this, for example, in a reception device which receives thirty units per second, it is possible to shorten the integration time to be less than a reception time (33 ms) per unit. From the viewpoint of suppressing an excessively long integration time, it is preferable that the integration time be 2 ms to 20 ms, and it is more preferable that the integration time be 4 ms to 15 ms.

However, when a rate of one reception unit per second may yield less than thirty units, a longer integration time than the above-described integration time can be set.

In addition, it is preferable that an ending point of the relaxation current integration be a time point equal to or less than a predetermined value of the relaxation current speed. According to this, with respect to the measured value for the heat sensing which is already obtained, the detection of the relaxation current is rounded up without substantially influencing the result of the heat sensing, whereby a heat sensing process can be rapidly performed, and a calculation load can be decreased.

Meanwhile, as the measured value for the heat sensing, an example of the amount of relaxation current obtained by integrating the relaxation current is described, but without being limited thereto, if there is a correlation with the amount of relaxation current obtained by integrating the relaxation current, it does not matter that the relaxation current speed or the relaxation current density is set as the measured value for the heat sensing.

EXAMPLES

Hereinafter, examples are described, but the invention is not limited to the following examples.

Solution Production

Example 1

First, bismuth acetate, lanthanum acetate, iron acetate, and manganese acetate are mixed in a material amount ratio 75:25:97:3, to which propionic acid is added, and are heated and stirred on a hot plate at 140° C. for one hour, and then adjusted to 0.3 $molL^{-1}$ using the propionic acid, whereby a BLFM precursor solution (solution 1) according to example 1 is produced.

Solution Production

Examples 2 to 6

Except that titanium tetraisopropoxide is added to raw materials of example 1, and the bismuth acetate, the lanthanum acetate, the iron acetate, the manganese acetate, and the titanium tetraisopropoxide are mixed in a material amount ratio of 80:20:96:3:1, 77.5:22.5:96:3:1, 75:25:96:3:1, 72.5:27.5:96:3:1, and 70:30:96:3:1, the BLFMT precursor solutions (solutions 2 to 6) according to examples 2 to 6 are produced by the same steps as those of the above-described BLFM precursor solution.

Production of First Electrode, Antiferroelectric Film, and Second Electrode

Example 1

First, a silicon dioxide film is formed on a surface of a single crystal silicon substrate using a thermal oxide. Next, a titanium nitride aluminum film with a thickness of 50 nm, an iridium film with a thickness of 100 nm, an iridium oxide film with a thickness of 30 nm, and a platinum film with a thickness of 150 nm are sequentially laminated on the silicon dioxide film, using a DC magnetron sputtering method, whereby the first electrode is produced.

The above-described solution 1 is coated on the first electrode at 1500 rpm using the spin coat method. Next, after being heated on the hot plate for two minutes at 180° C., the coated first electrode is heated at 350° C. for three minutes. After the coating-heating steps are repeated four times, the coated first electrode is heated at 650° C. for five minutes in nitride using a Rapid Thermal Annealing (RTA) device. By repeating this series of steps two times, the antiferroelectric film is produced.

A Pt electrode pattern with a thickness of 100 nm is formed on the produced antiferroelectric film using a metal through mask and the sputtering method. Next, a baking process is performed at 650° C. for five minutes in nitride using the Rapid Thermal Annealing (RTA) device, whereby the second electrode is produced. By the steps described above, a heat sensing element according to example 1 is produced.

Production of First Electrode, Antiferroelectric Film, and Second Electrode

Examples 2 to 6

Except that the solution which uses the spin coat method is modified to the above-described solutions 2 to 6, respectively, heat sensing element according to the examples 2 to 6 is produced by the same steps as those of the example 1.

Scanning Type Electron Microscope Observation

The thicknesses of the heat sensing elements according to the examples 1 to 6 were observed on a fracture surface by a scanning electron microscope (SEM). As a result, the thicknesses of the heat sensing elements according to the examples 1 to 6 were values within a range of 357 nm to 389 nm. A specific measured result is represented in Table 1.

TABLE 1

| | Composition | Film thickness (nm) | Amount of spontaneous polarization [$\mu Ccm^{-2}$] | Relaxation current coefficient [$nCcm^{-2} K^{-1}$] |
|---|---|---|---|---|
| Example 1 | BLFM (75/25/97/3) | 357 | 49 | −545 |
| Example 2 | BLFMT (80/20/96/3/1) | 377 | 57 | −8 |
| Example 3 | BLFMT (77.5/22.5/96/3/1) | 381 | 54 | −45 |
| Example 4 | BLFMT (75/25/96/3/1) | 385 | 45 | −469 |
| Example 5 | BLFMT (72.5/27.5/96/3/1) | 385 | 26 | 61 |
| Example 6 | BLFMT (70/30/96/3/1) | 389 | 10 | −17 |

X-Ray Diffraction Measurement

Structures and orientations of the heat sensing elements according to the examples 1 to 6 were measured by using "D8 Discover" manufactured by Bruker. CuKα was used as a line source, and GADDS (two dimensional detector) was used as a detector. As a result, they were all $ABO_3$ structures that were preferentially oriented in a (111) plane, and abnormality or the like was not observed.

P-E Loop Measurement

With regard to the heat sensing elements according to the examples 1 to 6, "FCE-1A" manufactured by Toyo Technique Company was used, an electrode pattern in which ϕ=500 μm was used, a triangle wave with a frequency of 1 kHz was applied at room temperature, and a relationship (P-E loop) between an amount of polarization P ($\mu Ccm^{-2}$) and an electric field E (V) was determined. FIGS. 5A to 5F each illustrates a P-E loop.

As illustrated in FIGS. 5A to 5F, in the heat sensing elements according to the examples 2 to 3, hysteresis of ferroelectricity is observed. In addition, in the heat sensing elements according to the examples 1 and 4 to 6, double hysteresis of antiferroelectricity is observed. Meanwhile, in the heat sensing elements according to the examples 2 to 3, the hysteresis of ferroelectricity is illustrated, regardless of even the fact that the material amount ratio of La/(Bi+La) is relatively large to be 22.5%. It is considered to be caused by residual stresses being different due to a difference between substrate configurations, the residual stresses being different due to a difference of the precursor solutions, orientation directions being different, or the like.

Current-Time Curve Evaluation with Respect to Rectangular Pulse

With regard to the heat sensing element according to the example 1, "TFA2000HS" manufactured by Aguzakuto Company was used, and when the rectangular pulse of 20 V was applied at 30° C. and 50° C., current-time curves were obtained. The measured result is illustrated in FIG. 4.

As illustrated in FIG. 4, it is confirmed that the phase transition (F→AF) ends more quickly in the measured result at 50° C., compared to that at 30° C. Thus, it is found that the time required for the phase transition (F→AF) depends on the heat energy.

Figure 6:
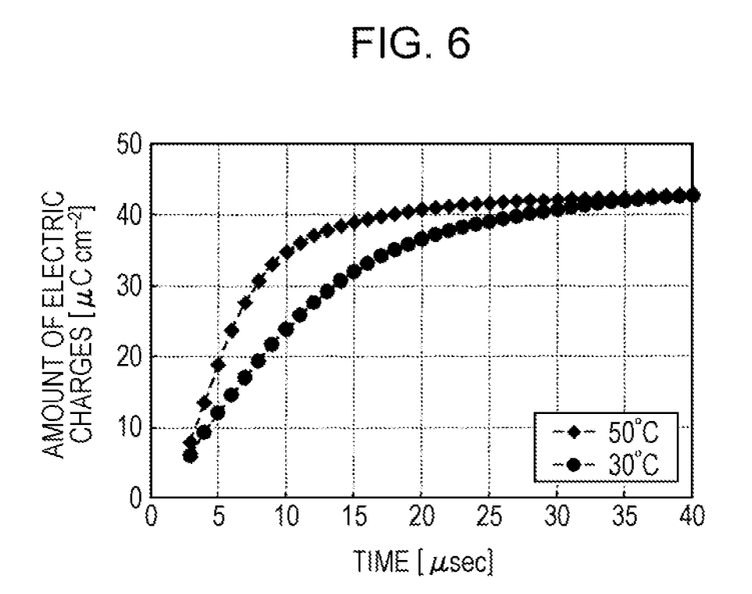
FIG. 6 is a diagram illustrating time dependence of an amount of a relaxation current with regard to the examples.
Figure 7A:
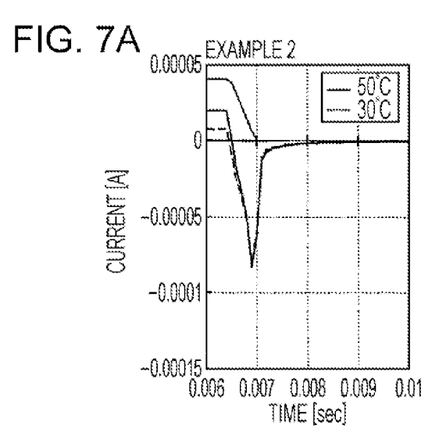
FIGS. 7A to 7E are diagrams illustrating current-time curves with regard to the examples 2 to 6.
Figure 7B:
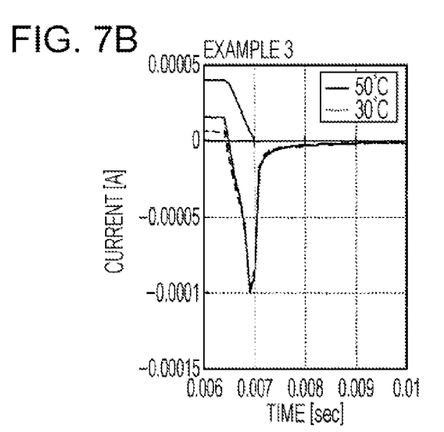
Figure 7C:
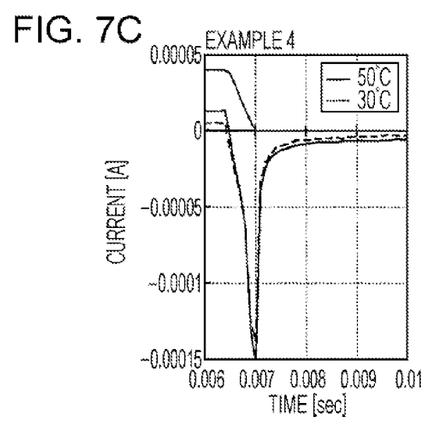
Figure 7D:
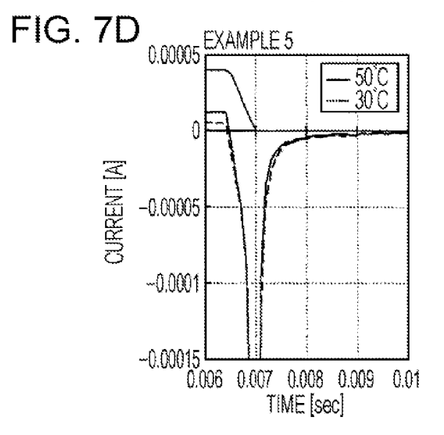
Figure 7E:
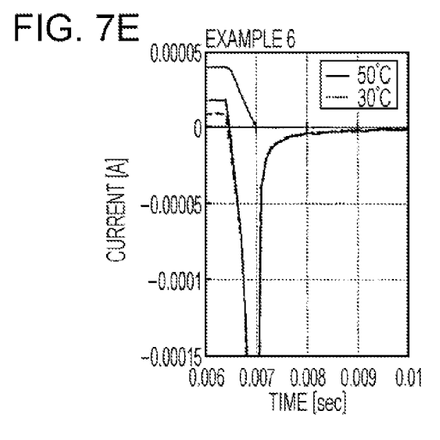

In addition, in FIG. 6, a time when the application of the rectangular pulse ends is denoted on a horizontal axis, and the amount of electric charges are denoted on a vertical axis. As illustrated in FIG. 6, it is confirmed that between 30° C. and 50° C., the amount of electric charges which flow in the end are the same as each other, but times thereof are different from each other. Thus, it is found that the amount of electric charges flowing after the application end of the rectangular pulse, has the time dependence. In addition, it is confirmed that under these measurement conditions, there is an area with the most different time dependence with respect to the amount of electric charges flowing near 10 μsec from the time when the application of the rectangular pulse ends, at 30° C. and 50° C.

From FIG. 6, the amount of electric charges flowing between the time when the application of the rectangular pulse ends, and a time 10 ms after the time when the application of the rectangular pulse ends, are −24 $\mu Ccm^{-2}$ at 30° C. and −35 $\mu Ccm^{-2}$ at 50° C. (positive and negative in voltage application direction as a reference). That is, the sensitivity with respect to the temperature is −545 $nCcm^{-2}K^{-1}$.

Meanwhile, as the related art, a pyroelectricity coefficient is 30 $nCcm^{-2}K^{-1}$, and compared to the infrared sensor in which the amount of electric charge per 1° C. is 0.12 pC, the infrared sensor of the example illustrated in FIG. 6 represents improvement of a temperature coefficient equal to or greater than 10 times.

FIGS. 7A to 7E illustrate current-time curves with respect to the rectangular pulse, in the heat sensing elements according to the examples 2 to 6. It is found that as illustrated in FIGS. 7A to 7E, in the examples 2 to 3 and 6, current behavior in an electric field zero at 30° C. approximately matches that at 50° C. This indicates that the temperature dependence is small. On the other hand, it is found that the heat sensing element according to the example 4 represents the same behavior as that of the heat sensing element according to the example 1.

Figure 8:
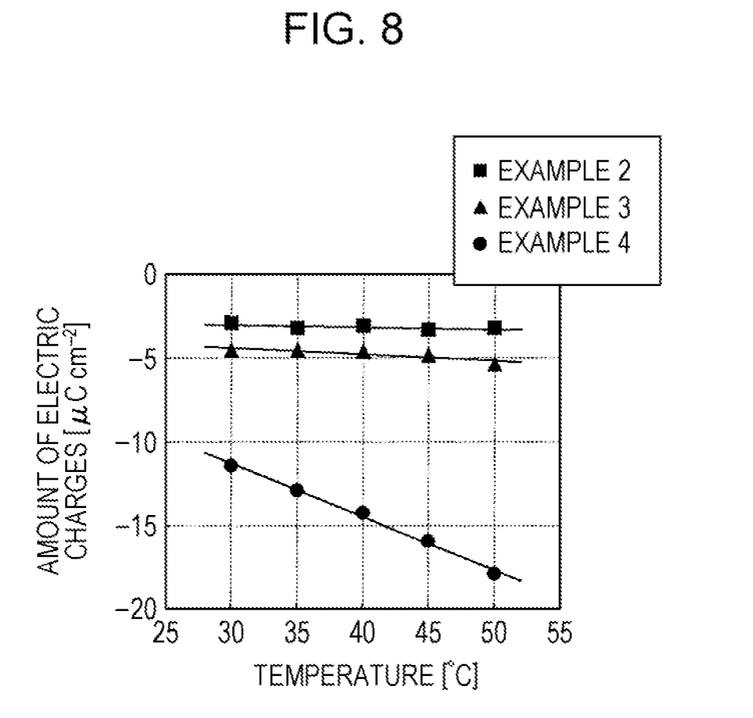
FIG. 8 is a diagram illustrating a relationship between an amount of electric charges and temperature with regard to the examples 2 to 4.

FIG. 8 is a diagram illustrating a relationship between the amount of electric charges and the temperature in the heat sensing elements according to the examples 2 to 4. The heat sensing elements according to the examples 2 and 3 have relatively small slopes of the amount of electric charges according to the temperature, that is, this indicates that temperature dependences thereof are small. In contrast, the heat sensing element according to the example 4 has a relatively large slope of the amount of electric charges according to the temperature, and this indicates that the temperature dependence is large. From this, it is found that among the examples 2 to 4, particularly, the heat sensing element according to the example 4 is excellent in terms of sensitivity improvement.

In addition, it is clear that since a difference between the examples 1 and 4 is only a presence and an absence of Ti in the composition, and from this result, the relaxation current flows regardless of the presence or absence of Ti.

On the other hand, in the heat sensing element according to the example 5, shortly after the application end of the rectangular pulse, the relaxation current at 30° C. flows more than at 50° C., and thereafter is at almost the same level. This is because the phase transition (F→AF) in the example 5 proceeds rapidly, but it is not fast enough to end before the voltage becomes zero through a voltage lowering process (period between time 1.5 ms to 2.0 ms illustrated in FIG. 4), and thus the relaxation current which flows at 30° C. and has a slow phase transition (F→AF) speed is observed even after the application end of the rectangular pulse.

A relaxation current coefficient obtained from the above-described result is as represented in Table 1. As represented in Table 1, it is clear that a sample which represents an amount of high spontaneous polarization and the double hysteresis, represents a high relaxation current coefficient.

Another Embodiment

The heat sensing element according to the embodiment of the invention represents a good pyroelectric characteristic, and thus can be used in an temperature detector, a biological detector, an infrared detector, a terahertz detector, a thermoelectric converter, or the like.

The invention can be used in an industrial field of the infrared sensor, the heat sensing element and the heat sensing method using the same. In addition, the heat sensing element can be configured using dielectric material which does not contain lead, and a burden on the environment can be decreased.

The entire disclosure of Japanese Patent Application No. 2013-062664, filed Mar. 25, 2013 is incorporated by reference herein.

What is claimed is:

1. An infrared sensor comprising:
    a heat sensing element in which a first electrode, a dielectric film, and a second electrode are sequentially laminated, the dielectric film having a property in which a phase transition between an antiferroelectric phase and a ferroelectric phase occurs, the antiferroelectric phase being a stable state, the ferroelectric phase being a metastable state, the dielectric film having a spontaneous polarization in a predetermined measurement environment;
    a portion adapted to calculate an amount of relaxation current flowing by a change of the spontaneous polarization with the phase transition from the ferroelectric phase to the antiferroelectric phase in the dielectric film; and
    a portion adapted to sense heat based on a temperature dependence of the amount of relaxation current.

2. The infrared sensor according to claim 1,
    wherein the dielectric film is configured in such a manner that the spontaneous polarization is gradually changed in the predetermined measurement environment.

3. The infrared sensor according to claim 1,
    wherein the dielectric film is preferentially oriented in a (111) plane.

4. The infrared sensor according to claim 1, further comprising:
    a power supply adapted to supply a voltage during a predetermined period to the heat sensing element so that the phase transition from the antiferroelectric phase to the ferroelectric phase occurs in the dielectric film.

5. A heat sensing method that uses a heat sensing element including a dielectric film which is formed between a first electrode and a second electrode, the dielectric film having a property in which a phase transition between an antiferroelectric phase and a ferroelectric phase occurs, the antiferroelectric phase being a stable state, the ferroelectric phase being a metastable state, the dielectric film having a spontaneous polarization in a predetermined measurement environment, the method comprising:
    applying to the heat sensing element a voltage so that the phase transition from the antiferroelectric phase to the ferroelectric phase occurs in the dielectric film;
    stopping applying the voltage to the heat sensing element; and
    after applying the voltage is stopped, calculating an amount of relaxation current flowing by a change of the spontaneous polarization with the phase transition from the ferroelectric phase to the antiferroelectric phase in the dielectric film, and sensing heat based on a temperature dependence of the amount of relaxation current.

6. The heat sensing method according to claim 5,
    wherein the heat is sensed by using a difference obtained by comparing the calculated amount of relaxation current with a reference value.

7. The heat sensing method according to claim 6,
    wherein the reference value is an amount of relaxation current generated in the heat sensing element in a state where infrared light is shielded, or an amount of relaxation current generated in the heat sensing element for reference which does not generate a resistance change based on the infrared light.

* * * * *